United States Patent [19]

Umezawa

[11] Patent Number: 5,079,542
[45] Date of Patent: Jan. 7, 1992

[54] ABNORMAL TEMPERATURE DETECTOR FOR ELECTRONIC APPARATUS

[75] Inventor: Kazuhiko Umezawa, Tokyo, Japan
[73] Assignee: NEC Corporation, Tokyo, Japan
[21] Appl. No.: 665,576
[22] Filed: Mar. 6, 1991
[30] Foreign Application Priority Data
  Mar. 8, 1990 [JP] Japan .................................. 1-58601
[51] Int. Cl.[5] ............................................. G08B 17/06
[52] U.S. Cl. ..................................... 340/587; 340/593
[58] Field of Search ........ 340/593, 508, 587, 521-522; 374/205

[56] References Cited

U.S. PATENT DOCUMENTS 4,399,428  8/1983  Hughes et al. ................... 340/588 X
4,611,197  9/1986  Sansky ............................ 340/508 X

*Primary Examiner*—Glen R. Swann, III
*Assistant Examiner*—Thomas J. Mullen, Jr.
*Attorney, Agent, or Firm*—Burns, Doane, Swecker & Mathis

[57] ABSTRACT

An abnormal temperature detector for an electronic apparatus includes a plurality of temperature detectors, an abnormality detector, and a power supply controller. The plurality of temperature detectors are arranged at least at one detection point of a rack, of an electronic apparatus, in which a plurality of wiring boards having IC elements mounted thereon are housed, and respectively output detection outputs when a temperature at the detection point becomes a preset temperature or more. The abnormality detector detects that detection outputs are output from all the temperature detectors at the detection point. The power supply controller interrupts a power supply of the apparatus in response to an abnormality detection output from the abnormality detector.

9 Claims, 4 Drawing Sheets

ABNORMAL TEMPERATURE DETECTOR FOR ELECTRONIC APPARATUS

BACKGROUND OF THE INVENTION

The present invention relates to an abnormal temperature detector for an electronic apparatus.

Electronic equipment such as a data processor is designed such that a plurality of wiring boards having IC elements mounted thereon are housed in a rack. The IC elements are cooled by forced convection of air using cooling fans to prevent a rise in temperature of each element and to maintain reliability.

In order to prevent a breakdown of such an apparatus, which is caused by a rise in temperature of the IC elements upon failure of the cooling fans or the like, the following method is employed. A detector is used to detect an atmospheric temperature near the rack. Upon detection of a temperature higher than a predetermined temperature, the detector sends a signal to a power supply circuit to stop the supply of power to the apparatus, thus protecting it.

FIG. 4 shows a conventional abnormal temperature detector.

Referring to FIG. 4, reference numeral 101 denotes a rack for housing wiring boards having IC elements mounted thereon; 102, a cooling fan; 103, a thermostat designed to open a contact at a preset temperature or more; 104, an abnormality detector; and 105, a power supply controller.

When a temperature near the rack 101 is increased to the preset temperature or more upon failure of the cooling fans 102 or the like, the contacts of the thermostats 103 are opened. The abnormality detector 104 detects this state and outputs a signal to the power supply controller 105 to stop the supply of power to the apparatus.

According to the above-described conventional abnormal temperature detector for electronic equipment, however, when the contacts are opened upon failure of the thermostats, or cables for connecting the thermostats to the power supply controller are disconnected, an abnormal temperature is erroneously detected to cause the power supply controller 105 to stop the supply of power to the apparatus.

SUMMARY OF THE INVENTION

It is a principal object of the present invention to provide an abnormal temperature detector for an electronic apparatus, which can improve the reliability of the electronic apparatus.

It is another object of the present invention to provide an abnormal temperature detector for an electronic apparatus, which is free from operation errors caused by a breakdown of a temperature detecting means.

It is still another object of the present invention to provide an abnormal temperature detector for an electronic apparatus, which is free from operation errors caused by disconnection of a wiring system.

In order to achieve the above objects, according to the present invention, there is provided an abnormal temperature detector for an electronic apparatus, comprising a plurality of temperature detecting means, arranged at least at one detection point of a rack, of an electronic apparatus, in which a plurality of wiring boards having IC elements mounted thereon are housed, for respectively outputting detection outputs when a temperature at the detection point becomes not less than a preset temperature, abnormality detecting means for detecting that detection outputs are output from all the temperature detecting means at the one detection point, and power supply control means for interrupting a power supply to the apparatus in response to an abnormality detection output from the abnormality detecting means.

DESCRIPTION OF THE PREFERRED EMBODIMENTS

The present invention will be described below with reference to the accompanying drawings.

Figure 1:
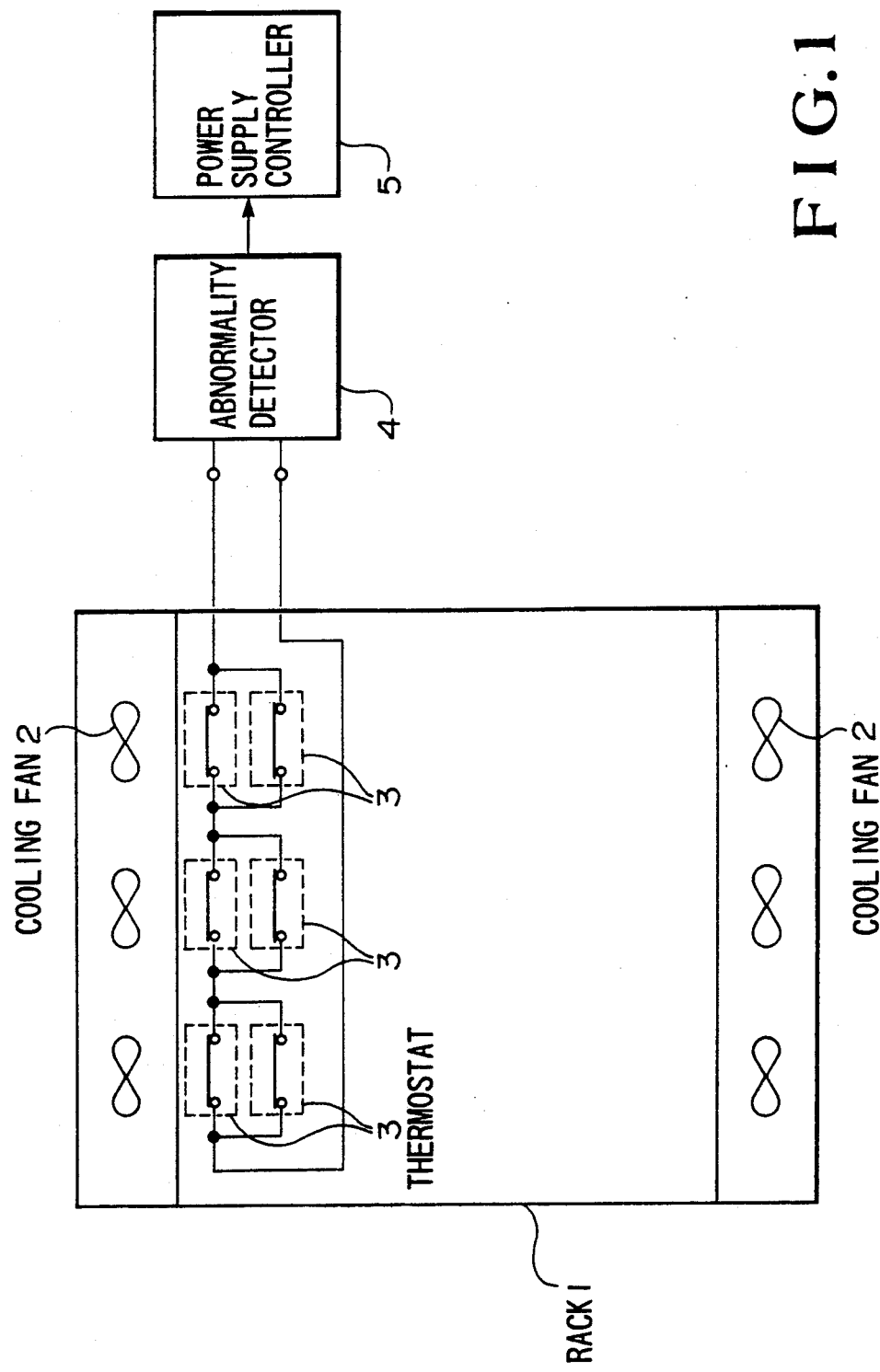
FIGS. 1, 2 and 3 are block diagrams respectively showing the first, second, and third embodiments of the present invention.

FIG. 1 shows the first embodiment of the present invention.

Referring to FIG. 1, reference numeral 1 denotes a rack for housing a plurality of wiring boards having IC elements mounted thereon; 2, a cooling fan; and 3, a thermostat which is arranged near the rack 1 and opens a contact at a preset temperature or more.

The thermostats 3 are arranged in pairs at the respective detection points. One thermostat of each thermostat pair connects the respective detection points in series, while the two terminals of each of these series-connected thermostats are connected to those of the other thermostat of each thermostat pair. Reference numeral 4 denotes an abnormality detector. When the temperature in an electronic apparatus is increased upon failure of the cooling fans 2 or the like, and the contacts of the thermostats 3 are opened, the abnormality detector 4 detects this state and sends a detection output. Reference numeral 5 denotes a power supply controller. Upon reception of the detection output from the abnormality detector 4, the power supply controller 5 stops the supply of power to the apparatus.

Assume that the two thermostats of a given pair function properly. In this case, if a temperature near the rack is lower than the preset temperature, the contacts of the two thermostats are closed.

When a temperature near the rack is increased to the preset temperature or more upon failure of the cooling fans 2 or the like, the contacts of the two thermostats are opened. The abnormality detector 4 detects this state and supplies a detection output to the power supply controller 5, thus stopping the supply of power to the apparatus.

Assume that one of the thermostats is broken down to open the contact at a temperature lower than the preset temperature. In this case, if the other thermostat functions properly, the abnormality detector 4 does not detect the open state of the contact and hence does not stop the supply of power to the apparatus.

Figure 2:
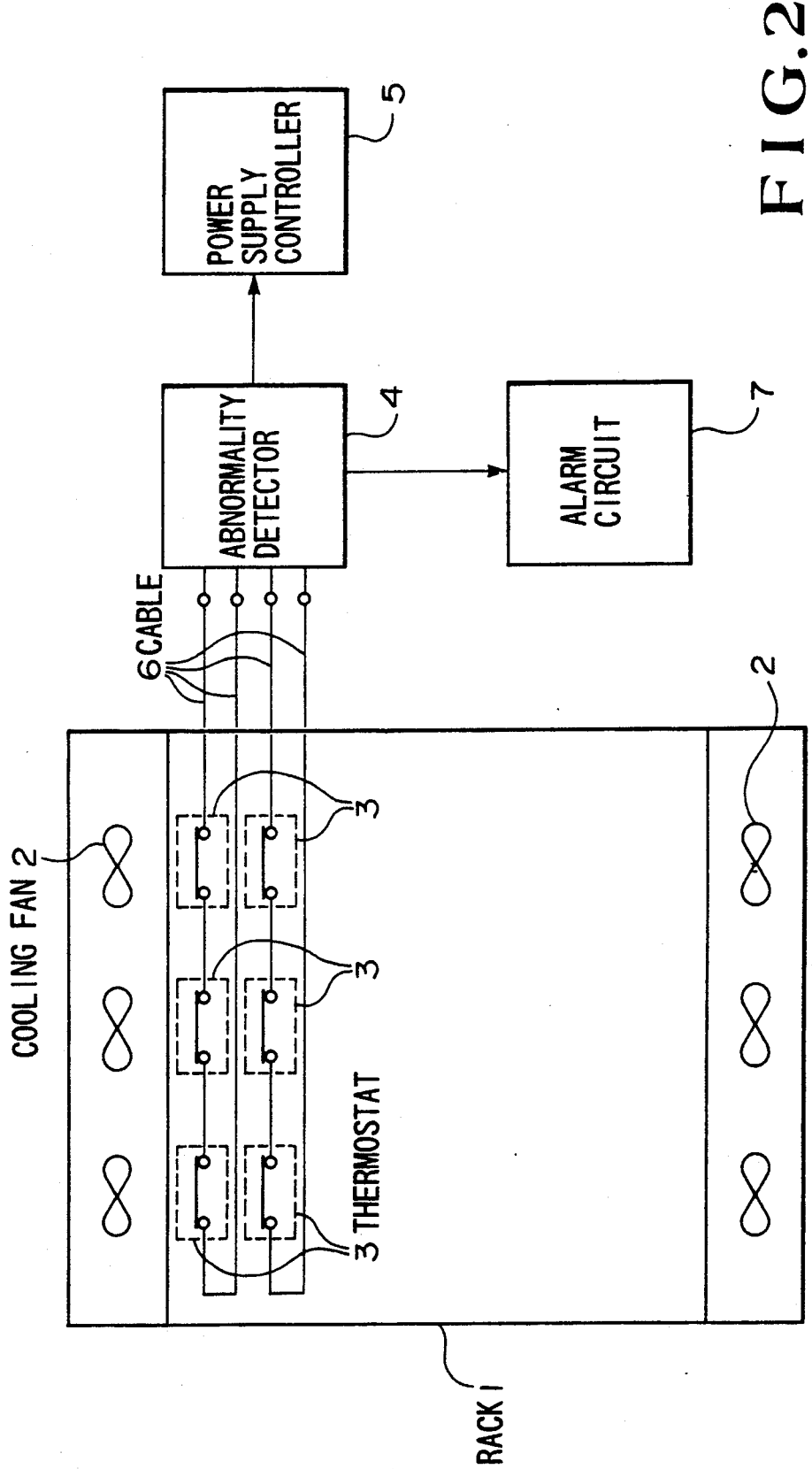

FIG. 2 shows the second embodiment of the present invention.

In the second embodiment, thermostats 3 are attached in pairs at the respective detection points, as in the first embodiment. However, in the second embodiment, the two thermostats 3 of each pair are independently connected to an abnormality detector 4 through cables 6 of independent, parallel wiring systems.

In this arrangement, upon detection of an open state of the contact of a given thermostat 3 in one wiring system, the abnormality detector 4 drives an alarm circuit 7 to generate an alarm to inform a failure. The abnormality detector 4 supplies an output to a power supply controller 5 to stop the supply of power to the apparatus only when it detects that the contacts of given thermostats 3 in the two wiring systems are open.

With this operation, even if the cable 6 between the thermostats 3 and the abnormality detector 4 is disconnected, and if the disconnection occurs in only one of the wiring systems, the abnormality detector 4 does not detect a contact open state at any detection point. Therefore, the supply of power is not erroneously interrupted.

Figure 3:
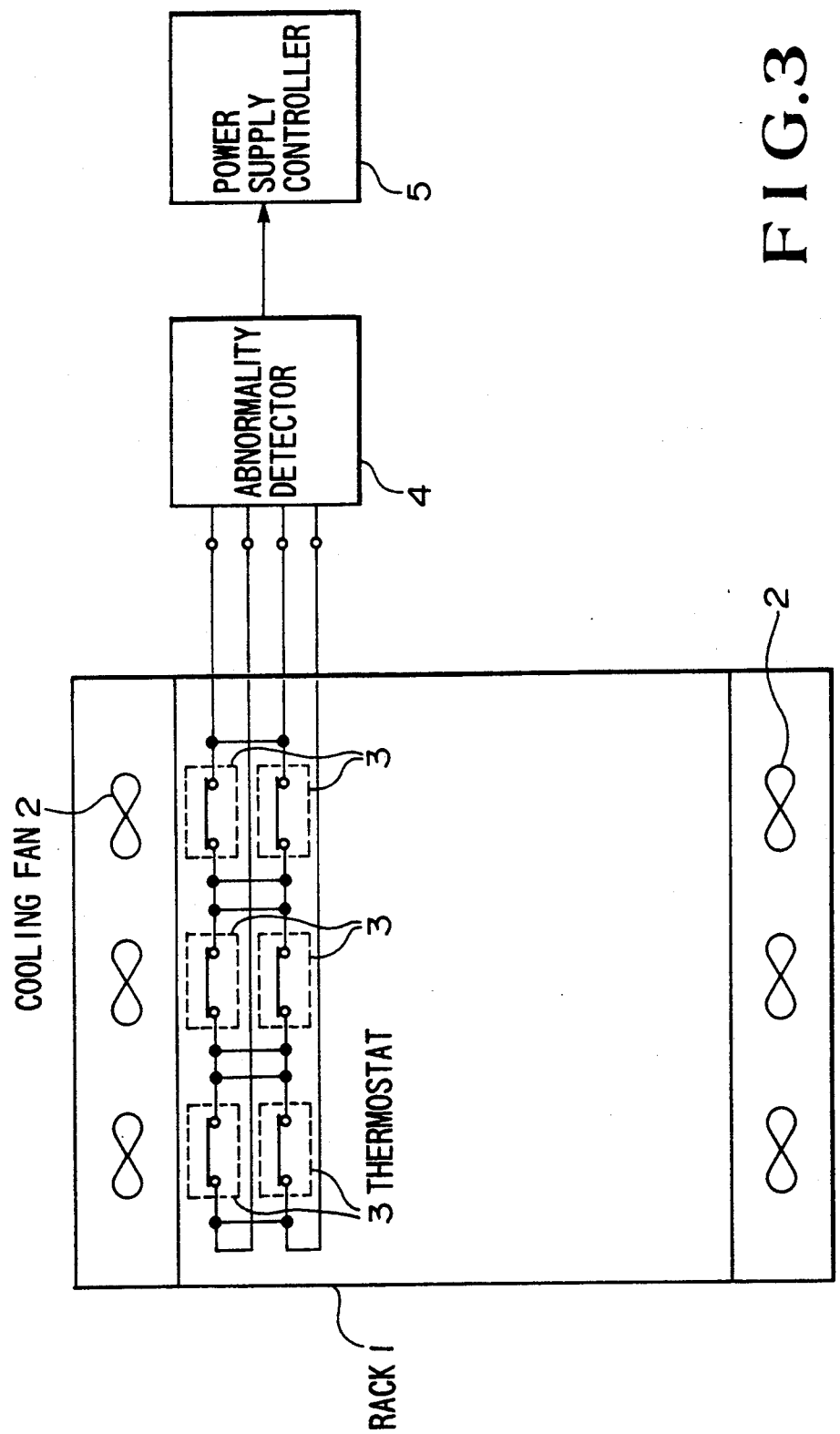
Figure 4:
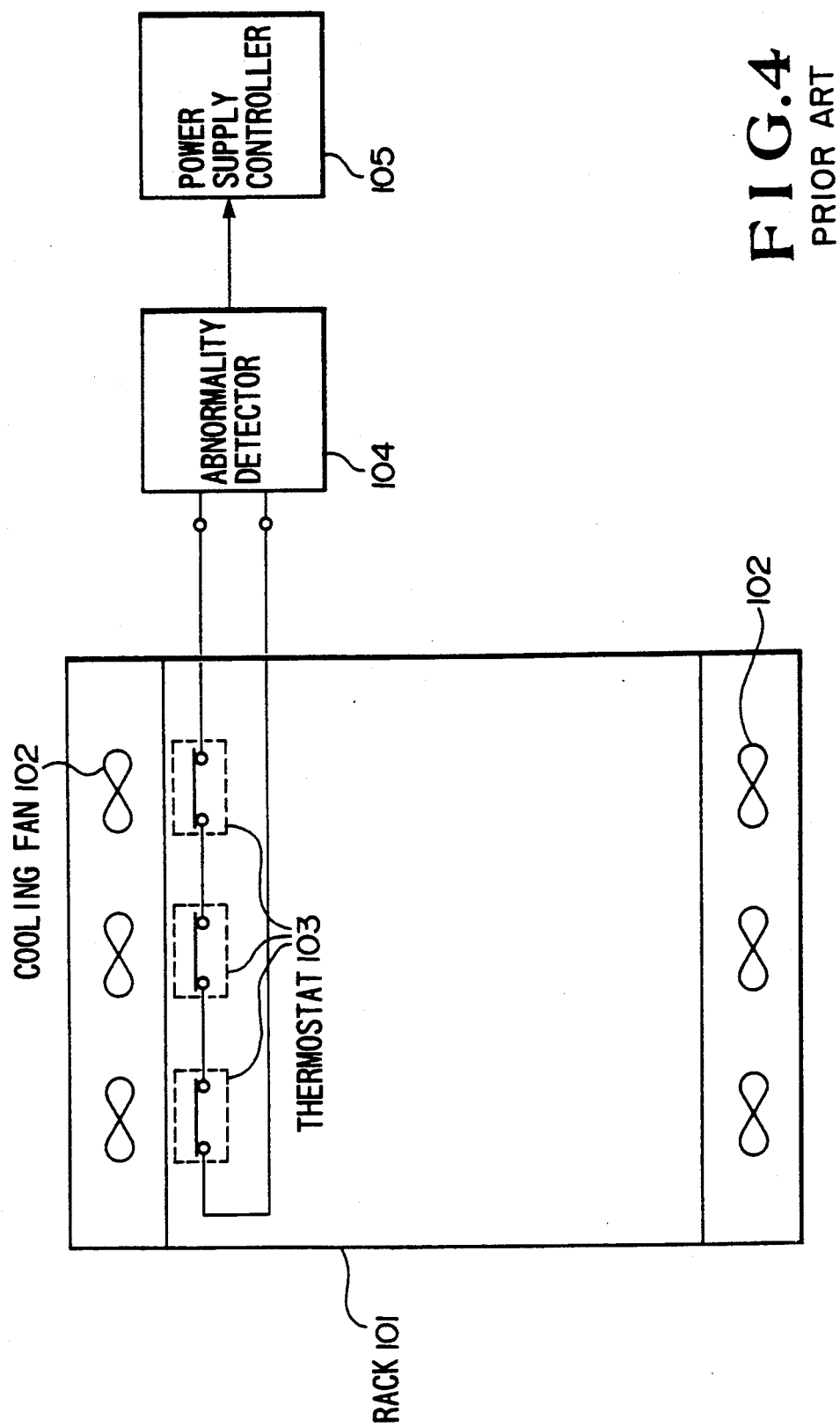
FIG. 4 is a block diagram showing a conventional abnormal temperature detector.

FIG. 3 shows the third embodiment of the present invention.

The third embodiment is the same as the second embodiment except that the two terminals of one of the two thermostats at each detection point are connected to those of the other thermostat. With this arrangement, only when the two thermostats 3 at one detection point are simultaneously opened, the supply of power to the apparatus is stopped by an output from an abnormality detector 4. Therefore, even if one of each of thermostat pairs at different detection points fails, the power supply is not erroneously interrupted. In each embodiment described above, the abnormality detector 4 and the power supply controller 5 may be integrated into one circuit.

According to the present invention, the abnormal temperature detector for an electronic apparatus is designed to prevent erroneous interruption of the supply of power to the apparatus upon failure of a thermostat for detecting abnormality or disconnection of a wiring system of a circuit. The present invention can be effectively applied especially to a system required to process a large amount of data and to be operated without interruption, such as a large data processor.

As has been described above, according to the present invention, since a plurality of temperature detecting means, which open contacts at a preset temperature or more, are arranged at each detection point, a power supply is not erroneously interrupted upon failure of some of the temperature detecting means or disconnection of a wiring system. Therefore, the overall apparatus ca be improved in reliability.

What is claimed is:

1. An abnormal temperature detector for an electronic apparatus, comprising:
   a plurality of temperature detecting means, arranged at least at one detection point of a rack of an electronic apparatus, in which a plurality of wiring boards having IC elements mounted thereon are housed, for respectively outputting overtemperature signals when a temperature at one of said at least one detection point becomes not less than a preset temperature;
   abnormality detecting means for signalling when said preset temperature is sensed by all the temperature detecting means at said one detection point; and
   power supply control means are interrupting a power supply to the apparatus in response to an abnormality detection output from said abnormality detecting means.

2. A detector according to claim 1, wherein each of said temperature detecting means includes one contact which is opened at a temperature not less than the preset temperature.

3. A detector according to claim 2, wherein said contact of each of said temperature detecting means constitute a parallel circuit, and two terminals of said parallel circuit are connected to said abnormality detecting means.

4. A detector according to claim 2, wherein a plurality of detection points are arranged.

5. A detector according to claim 4, wherein said temperature detecting means at each detection point constitute a parallel circuit, and said plurality of parallel circuits at the respective detection points are connected in series with said abnormality detecting means.

6. A detector according to claim 4, wherein said temperature detecting means at each detection point comprise opposing contacts which are respectively connected to said abnormality detecting means through independent, parallel wiring systems, and said abnormality detecting means outputs a detection output upon detecting that said contacts of said temperature detecting means in all said wiring systems are opened.

7. A detector according to claim 6, further comprising alarm means for generating an alarm, said abnormality detecting means driving said alarm means upon detecting an open state of said contact of said temperature detecting means in only one part of said wiring system.

8. A detector according to claim 6, wherein two terminals of one of said opposing contacts of said temperature detecting means at each detection point are connected to those of the other of said opposing contacts.

9. A detector according to claim 1, wherein said rack in which said plurality of wiring boards are housed is forcibly cooled by cooling fans.

* * * * *